United States Patent
Lee

(10) Patent No.: US 7,592,711 B1
(45) Date of Patent: Sep. 22, 2009

(54) SELF-PROPELLED WIND POWER GENERATOR

(75) Inventor: Hae Sook Lee, 18791 Arata Way, Cupertino, CA (US) 95014

(73) Assignee: Hae Sook Lee, Mountain View, CA (US)

( * ) Notice: Subject to any disclaimer, the term of this patent is extended or adjusted under 35 U.S.C. 154(b) by 88 days.

(21) Appl. No.: 11/959,495

(22) Filed: Dec. 19, 2007

(51) Int. Cl.
*F03D 9/00* (2006.01)
(52) U.S. Cl. .......................................... 290/44; 290/55
(58) Field of Classification Search ................... 290/44, 290/55
See application file for complete search history.

(56) References Cited

U.S. PATENT DOCUMENTS

| | | | |
|---|---|---|---|
| 4,087,927 A * | 5/1978 | Basmajian | 434/389 |
| 4,159,426 A * | 6/1979 | Staton | 290/44 |
| 5,512,788 A * | 4/1996 | Berenda et al. | 290/55 |
| 5,734,202 A * | 3/1998 | Shuler | 290/55 |
| 5,800,121 A * | 9/1998 | Fanelli | 415/199.5 |
| 5,998,882 A * | 12/1999 | Alston | 290/54 |
| 6,365,985 B1 * | 4/2002 | Cohen | 290/55 |
| 7,275,719 B2 * | 10/2007 | Olson | 244/155 A |
| 7,279,802 B2 * | 10/2007 | Pasuri | 290/44 |
| 7,368,828 B1 * | 5/2008 | Calhoon | 290/55 |
| 2005/0122679 A1 * | 6/2005 | Von Gutfeld et al. | 361/687 |
| 2007/0138797 A1 * | 6/2007 | Reidy et al. | 290/44 |

FOREIGN PATENT DOCUMENTS

WO    WO 2005071260 A1 *  5/2005

* cited by examiner

*Primary Examiner*—Joseph Waks

(57) ABSTRACT

A self-propelled wind power regenerator powered by the natural wind, by a propeller or a combination of both, depending on the condition of the wind and the demand of the electricity. During the period when the natural wind flows constantly above the cut-in wind speed, the wind turbine may be powered by the natural wind. When the useable natural wind becomes unavailable, the propeller is activated by a sensor that detects the drop of the output of the wind turbines. The propeller thus keeps the wind turbines running at the level of rated wind speed, and maintains the quality of the wind power regardless of the natural wind condition.

8 Claims, 3 Drawing Sheets

SELF-PROPELLED WIND POWER GENERATOR

REFERENCES CITED

U.S. Pat. No. 7,279,802 B2 Oct. 9, 2007 Pasuri

U.S. Pat. No. 7,275,719 B2 Oct. 2, 2007 Olson

BACKGROUND OF THE INVENTION

This present invention relates to a wind power generator, wherein a stable electrical power is obtained by propelling the wind turbines with the combined energy of the natural wind and a propeller.

Wind energy is plentiful, renewable, widely distributed and produces the lowest level of pollution. However, due to the variability and the intermittency of the natural wind, the electricity generated from wind power generator is unstable, and often causes reliability issues on the power grid. Besides, wind speeds are generally much lower during periods of the highest peak-load demand, typically from June to August in North America for example. This inverse relationship of the wind power availability and the peak demand of the electricity, the variability and the intermittency all together greatly increase the cost of the wind power generation and limits its usefulness.

SUMMARY OF THE INVENTION

Disclosed herein is the present invention Self-Propelled Wind Power Generator (SPWG). The object of the present invention is to provide a wind power generator, which delivers stable and high-quality electricity independent of the availability, and the fluctuation of the wind flow.

The self-propelled wind power regenerator, according to the invention, comprises at least two components: a wind turbine as the first component for electricity generation, and the propeller as the second component for converting any form of energy into kinetic energy that is capable of powering the first component. During the period when the natural wind flows stably above the cut-in wind speed, the wind turbine is powered by the natural wind. When the useable natural wind becomes unavailable, the second component is activated by a sensor that detects the drop of the output from the wind turbine, and starts to deliver the kinetic energy to keep the wind turbine rotating and continuing the generation of the power.

In one embodiment, the propeller is made of an electrical fan that has the wind characteristics matching the wind turbine's to deliver the wind flow powering the wind turbine in the most effective way.

The above, and other objects, features and advantages of the present invention will become apparent from the following description read in conjunction with the accompanying drawings, in which like reference numerals designate the same elements.

DETAILED DESCRIPTION OF THE INVENTION

While this invention may be embodied in many different forms, there is described in detail herein a specific embodiment of the invention. This description is an exemplification of the principles of the invention and is not intended to limit the invention to the particular embodiment illustrated.

Figure 1:
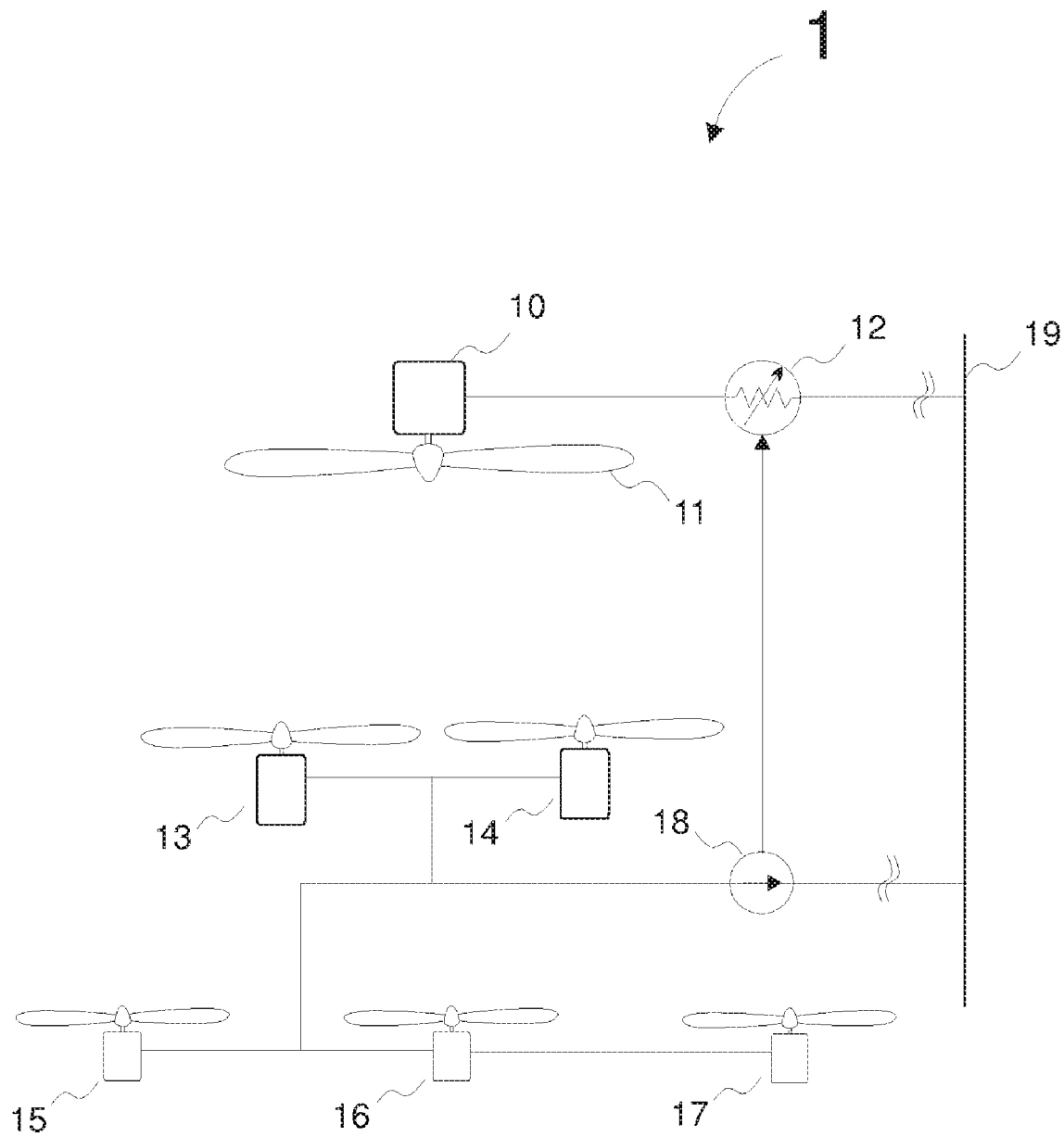
FIG. 1 shows the diagrammatic construction of a self-propelled wind power generator.
Figure 2:
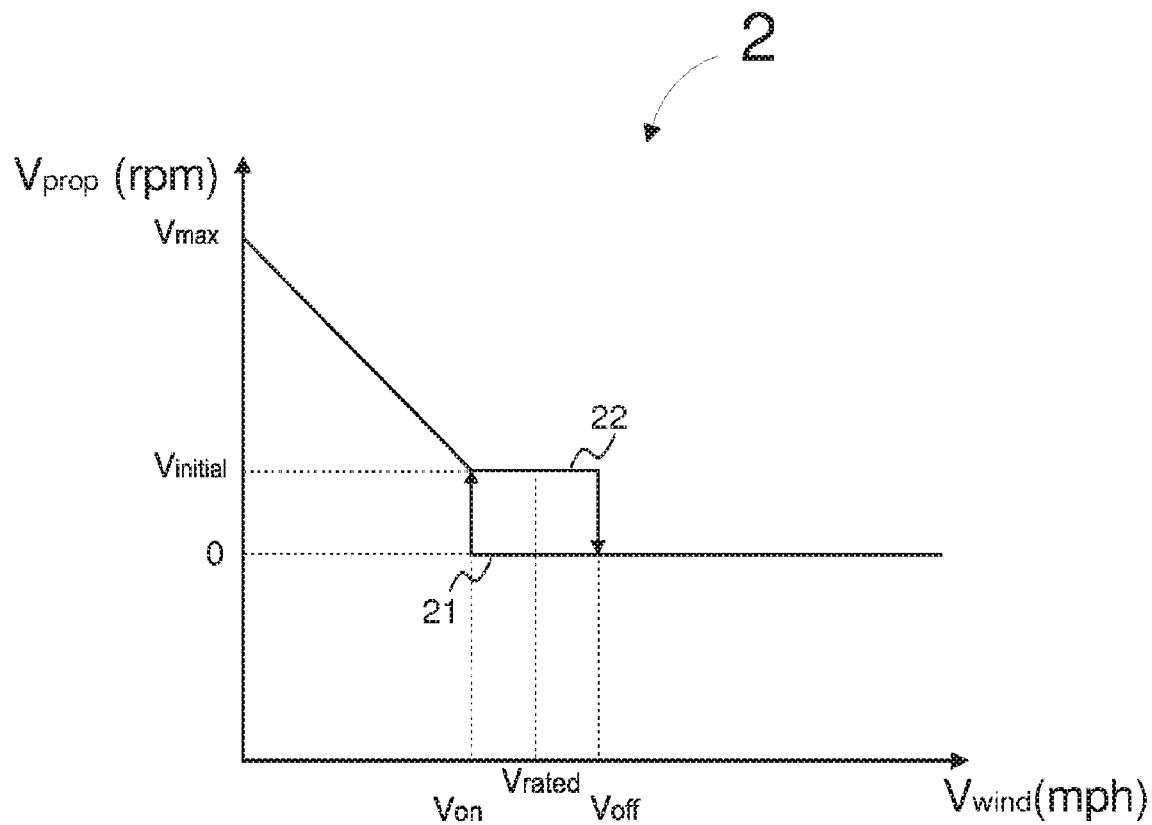
FIG. 2 is the hysteresis loop of the propeller speed as a function of the wind speed.
Figure 3:
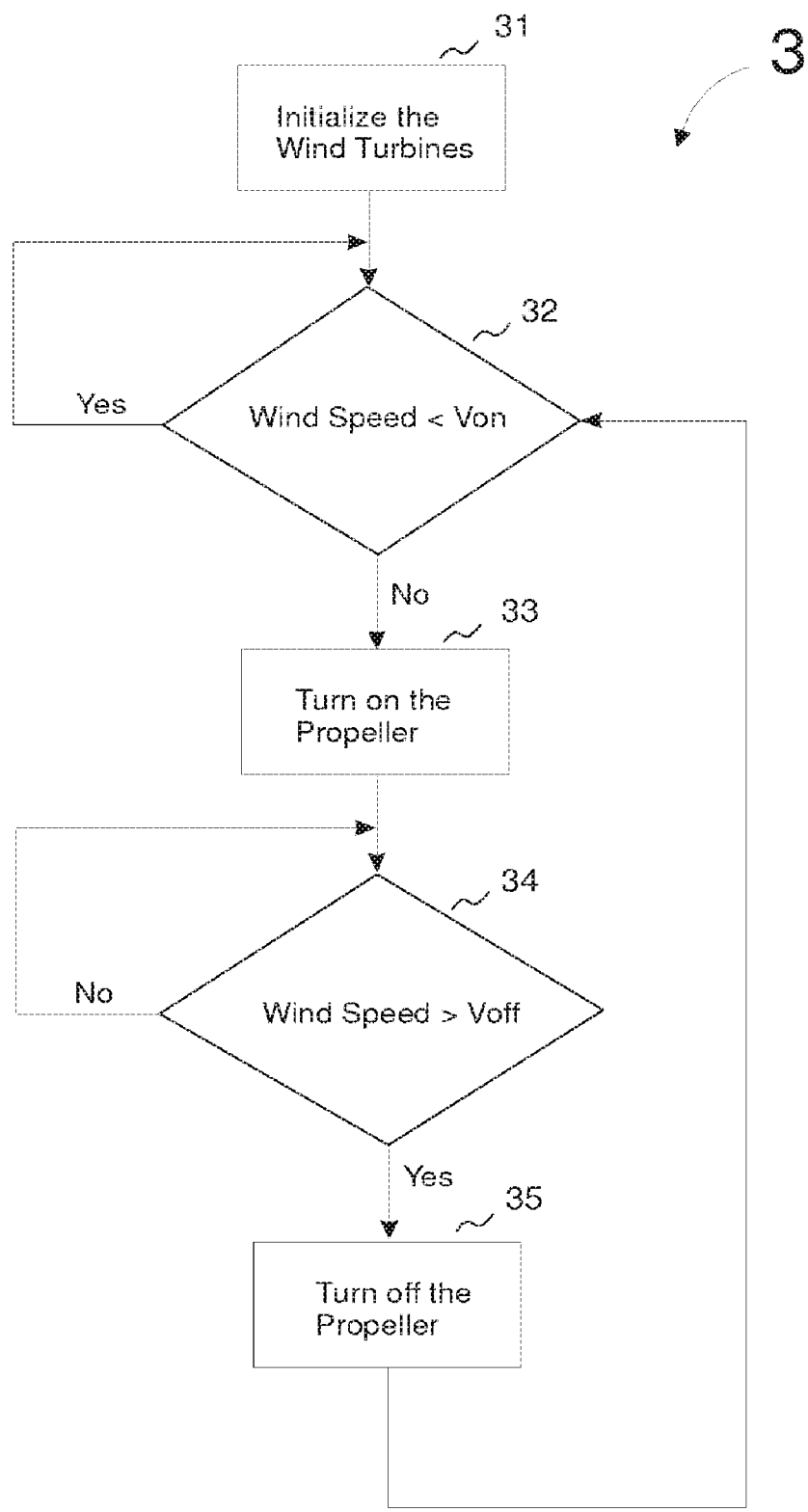
FIG. 3 is a flow diagram of a self-propelled wind power generator.

Referring to FIGS. 1, 2 and 3 the self-propelled wind power generator is illustrated. The wind power generator 1 has the following elements.

There is the first group of wind turbines comprising wind turbine unit 13, and 14. There may be the second group of wind turbines comprising wind turbine units 15, 16 and 17 as demonstrated in FIG. 1. More groups of wind turbine units may also be included. The wind turbine units of the first group are larger in capacity and are placed at the upwind, followed by the wind turbine units of the second group, the third group, and so on, which may be smaller in capacity and are placed at the downwind. They are all connected to the grid system 19. There is a propeller unit comprising an electrical motor 10 and rotor blades 11.

An electricity output monitor device 18 may be used to detect the electrical output from a single or from the combined output of a number of the wind turbine units. The output monitor device 18 sends a signal to a motor speed controller 12. The signal sent from the output monitor device 18 carries the information of the level of the electrical output from the wind turbine units. It adjusts the speed of revolution of the electrical motor 10 through varying the output level of the speed controller 12 as the electrical output from the wind turbine units 13, 14, 15, 16, and 17 varies.

According to the invention, when the natural wind blows above the rated speed plus a predefined upper hysteresis margin, the wind turbines may be propelled by the natural wind. When the natural wind goes below the rated speed minus a predefined lower hysteresis margin, an assisting propelling unit is activated and provides the power to carry on the wind power generation at near the optimal speed of revolution.

FIG. 2 shows a hysteresis loop having a upper hysteresis margin between the rated wind speed $V_{rated}$ and the propeller shut-off speed $V_{off}$, and a lower hysteresis margin between the rated wind speed $V_{rated}$ and the propeller turn-on speed $V_{on}$. Line segment 21 indicates that the propeller unit 10 and 11 remains off when the wind speed Vwind continues to drop until it reaches Von. The speed of revolution of the propeller Vprop is abruptly brought to the initial value Vinitial. As the wind speed continues to drop, Vprop goes higher until it reaches Vmax. Line segment 22 indicates that the propeller continues to run when the wind speed Vwind picks up until Vprop reaches Vinitial. If Vwind continues to rise above Voff, the propeller shuts off and the wind turbines 13, 14, 15, 16 and 17 will be powered completely by the natural wind.

Referring to FIG. 3, a flow diagram illustrating a method of operating the self-propelled wind power generator is shown. In step 31, the wind turbines are first enabled and initialized. A window of time may be given for the wind turbines to catch up with the existing wind before the output monitor device 18 is activated. In step 32, the wind speed or the output level of the wind turbines is continuously monitored. If the wind speed drops below a predefined level Von, the propeller is activated as step 33 shows. Now the wind speed or the output level is still continuously monitored. In step 34, if the wind speed rises above Voff, the propeller shuts off.

The above embodiments and particularly the drawings are set forth for purposes of illustration only. It will be understood that many variations and modifications of the embodiment herein described will be obvious to those skilled in the art, and may be carried out without departing from the spirit and scope of the invention.

What is claimed is:

1. A wind power generator comprising:
   a plurality of wind turbines;
   a propeller driving the said plurality of wind turbines;
   a monitor device constantly monitoring the wind speed or the electrical output from said plurality of wind turbines;
   a controller that controls the on/off state and the power level of said propeller.

2. The wind power generator of claim 1, wherein said plurality of wind turbines comprises at least a first groups of wind turbines, and preferably a second and/or more other groups of wind turbines, wherein the first groups of wind turbines are placed at the upwind and said second and/or more other groups of wind turbines at the down wind.

3. The wind power generator of claim 2, wherein said first group of wind turbines are largest in capacity, followed by said second and/or more other groups of wind turbines smaller in capacity.

4. The wind power generator of claim 1, wherein said propeller comprises at least an electrical motor and an energy conveying devices, preferably rotor blades.

5. The wind power generator of claim 1, wherein said monitor device detects the variation of the wind speed or the level of the electrical output of said plurality of wind turbines.

6. The monitor device of claim 5, wherein the variation of the wind speed or the level of the electrical output of said plurality of wind turbines is converted to a control signal which controls said controller.

7. The wind power generator of claim 1, wherein said controller receives the control signal from said monitor device and raises or lowers the power level of said propeller.

8. A method for operating said wind power generator of claim 1, comprises: said controller that turns on said propeller at a relatively higher said control signal and turns off said propeller at a relatively lower said control signal;
   the difference of the levels where said controller turns on and off said propeller forms a hysteresis window in the input-output characteristic diagram of said controller;
   said propeller adjusts the level of output power according to a pre-determined formulas or pre-programmed algorithm for optimal utilization of the wind power.

* * * * *